(12) United States Patent  
McCarthy

(10) Patent No.: US 12,053,080 B2  
(45) Date of Patent: Aug. 6, 2024

(54) RUCKING ARTICLE

(71) Applicant: GORUCK Holdings, LLC, Jacksonville Beach, FL (US)

(72) Inventor: Jason J. McCarthy, Jacksonville Beach, FL (US)

(73) Assignee: GoRuck Holdings, LLC, Jacksonville Beach, FL (US)

( * ) Notice: Subject to any disclaimer, the term of this patent is extended or adjusted under 35 U.S.C. 154(b) by 0 days.

(21) Appl. No.: 17/508,573

(22) Filed: Oct. 22, 2021

(65) Prior Publication Data

US 2022/0125183 A1 Apr. 28, 2022

Related U.S. Application Data

(60) Provisional application No. 63/104,193, filed on Oct. 22, 2020.

(51) Int. Cl.
| | |
|---|---|
| *A45F 3/08* | (2006.01) |
| *A45F 3/12* | (2006.01) |
| *H04L 1/1812* | (2023.01) |
| *H04W 72/1268* | (2023.01) |
| *H04W 74/0816* | (2024.01) |

(52) U.S. Cl.
CPC ............ *A45F 3/08* (2013.01); *A45F 3/12* (2013.01); *H04L 1/1812* (2013.01); *H04W 72/1268* (2013.01); *H04W 74/0816* (2013.01); *A45F 2003/122* (2013.01)

(58) Field of Classification Search
CPC ...... A45F 3/08; A45F 3/10; A45F 3/12; A45F 2003/122; A45F 2003/127
See application file for complete search history.

(56) References Cited

U.S. PATENT DOCUMENTS

| | | | |
|---|---|---|---|
| D266,971 S | 11/1982 | Katz et al. | |
| 4,420,103 A * | 12/1983 | Douglass | A45F 3/04 224/907 |
| 5,361,955 A * | 11/1994 | Gregory | A45F 3/047 224/907 |
| D354,619 S | 1/1995 | Soukeras | |
| 6,230,950 B1 | 5/2001 | Heetman | |
| D450,448 S | 11/2001 | Pierce et al. | |
| D604,049 S | 11/2009 | Chu et al. | |
| D690,502 S | 10/2013 | Bergquist | |
| D692,229 S | 10/2013 | Archambeau | |

(Continued)

FOREIGN PATENT DOCUMENTS

| | | |
|---|---|---|
| CA | 2518127 A1 | 3/2007 |
| CN | 305665419 | 3/2020 |

(Continued)

OTHER PUBLICATIONS

Goruck Ruck Plate Explained, https://www.youtube.com/watch?v=q5VNK6SPIns, first available Apr. 29, 2015, retrieved Nov. 9, 2022, 1 pp.

(Continued)

*Primary Examiner* — Derek J Battisti

(74) *Attorney, Agent, or Firm* — Offit Kurman, P.A.; Gregory A. Grissett

(57) ABSTRACT

An embodiment of the present disclosure of an article that includes a lumbar support member, internal frame assembly, and sternum strap for improving stability during use.

27 Claims, 10 Drawing Sheets

(56) References Cited

U.S. PATENT DOCUMENTS

| | | | |
|---|---|---|---|
| D733,420 S | 7/2015 | Archambeau | |
| 9,072,365 B1* | 7/2015 | Maneii | A45C 9/00 |
| D828,016 S | 9/2018 | Gillespie et al. | |
| D830,053 S | 10/2018 | Dumas | |
| 10,463,138 B1* | 11/2019 | Boutin | A45F 3/04 |
| D873,565 S | 1/2020 | Long | |
| 10,702,047 B1 | 7/2020 | Younan | |
| 2010/0176172 A1* | 7/2010 | Gleason, Jr. | A45F 3/04 |
| | | | 224/653 |
| 2011/0120893 A1* | 5/2011 | Rekuc | A45C 13/021 |
| | | | 206/320 |
| 2013/0221051 A1* | 8/2013 | Hairston | A45C 13/04 |
| | | | 156/305 |
| 2015/0157115 A1* | 6/2015 | Smith | A45F 3/08 |
| | | | 224/633 |
| 2016/0235186 A1* | 8/2016 | Chueh | A45F 3/04 |
| 2018/0352939 A1* | 12/2018 | Buffinton | A45F 3/08 |
| 2022/0304454 A1 | 9/2022 | McCarthy et al. | |
| 2022/0354239 A1 | 11/2022 | McCarthy et al. | |

FOREIGN PATENT DOCUMENTS

| | | |
|---|---|---|
| CN | 307305405 | 5/2022 |
| GB | 606926 | 8/2019 |
| JP | 2004008765 A1 | 1/2004 |
| KR | 200451347 Y1 | 12/2010 |
| WO | 2022087417 A1 | 4/2022 |
| WO | 2022236092 A1 | 11/2022 |

OTHER PUBLICATIONS

Goruck Products, https://www.goruck.com/products/ruck-plate-carrier, first available Oct. 23, 2020, retrieved Nov. 15, 2022, 8 pp.

Goruck Murph, https://www.youtube.com/watch?v=J_xl0-d7eLQ, first available May 8, 2020, retrieved Nov. 9, 2022, 2 pp.

Goruck, The Goruck Rucker 2.0 First Look & Preview, All Day Ruckoff, Feb. 23, 2018, 45 pp.

GoRuck Ruck Plate Carrier 2.0 Review, https://www.youtube.com/watch?v=AyR_nbVdg_k.

Authorized Officer: Miki Kobayashi, International Preliminary Report on Patentability, International Patent Application PCT/US2021/056261, Report Issued Apr. 13, 2023, 9 pp.

Authorized Officer: Daniela Dinesco, International Search Report and the Written Opinion, International Patent Application PCT/US2021/056261, Report Completed Feb. 2, 2022, 11 pp.

Authorized Officer: Manuel Henry, International Search Report and the Written Opinion, International Patent Application PCT/US2022/028129, Completed Aug. 9, 2022, 13 pp.

* cited by examiner

RUCKING ARTICLE

CROSS-REFERENCE TO RELATED APPLICATIONS

The present application claims priority to and the benefit of U.S. Provisional Patent Application No. 63/104,193, filed Oct. 22, 2020, the contents of which are hereby incorporated in its entirety.

TECHNICAL FIELD

The present disclosure relates to a rucking article.

BACKGROUND

Rucking is an exercise regimen that is used in military training protocols to build strength and endurance. A person carries a weighted sack or bag while completing various activities, like running, push-ups, etc. Specially designed nicking articles can be worn like a backpack and also include compartments for holding weighted plates, or nicking plates. Stability during use is important because of a wide range of upper and lower body movements involved in traditional nicking training protocols. The nicking article should carry weight but not necessarily inhibit the users balance and agility across a wide range of body movements during use.

SUMMARY

There is a need for nicking articles with improved stability. An embodiment includes a nicking article. The nicking article includes a base and a top spaced from the base, and lateral sides that extend from the base toward the top. The nicking article also includes a front panel coupled to the base. The nicking article also includes a back panel coupled to the base, the top, and the lateral sides. The back panel has an exterior side, an interior side opposite the exterior side, a height that extends from the base to the top, and a width that is perpendicular to the height. The nicking article also includes a plurality of pad members on the exterior side that extend across the width. A lumbar support member is located between the plurality of pad members and the base, where the lumbar support member has a thickness that is greater than a thickness of any one of the plurality of pad members. The nicking article also includes a closure that removably couples the front panel to the top and at least a portion of each of the lateral sides, such that the closure is configured to permit access to an interior of the nicking article. The nicking article also includes a pocket assembly coupled to the interior side of the back panel. The pocket assembly has at least a first pocket with a pocket width and a pocket length that is perpendicular to the pocket width, and a closure flap, where the pocket width and the pocket length is sized and selected to firmly hold a rucking plate inside the first pocket. The rucking article also includes an internal frame assembly inside a compartment of the back panel. The internal frame assembly extends from the base to the top within the compartment, such that, the internal frame assembly provides rigid support to the back panel along an entirety of the height of the back panel and the width. The rucking article also includes shoulder configured to secure the rucking article to a wearer. The nicking article also includes a sternum strap removably coupled to the shoulder straps and configured to be selectively clasped. The combination of the lumbar support member, the internal frame assembly, and the sternum strap are configured to maintain stability of the rucking article during active movement by the wearer when the rucking article is worn, and the sternum strap is clasped.

Another embodiment includes a rucking article. The nicking article also includes a base and a top opposite the base. The nicking article also includes a back panel having a bottom edge coupled to the base, a top edge opposite the bottom edge a coupled to the top, a first lateral edge, a second lateral edge opposite the first lateral edge, a height that extends from the bottom edge to the top edge, a width perpendicular to the height, an exterior side that faces a user's back when the nicking article is worn by the user, and an interior side opposite the exterior side. The nicking article also includes a first lateral side and a second lateral side opposite the first lateral side such that the first and second lateral sides defining a depth of the nicking article that is perpendicular to the height and the width. The nicking article also includes a first closure element that extends along at least a portion of the top edge, the first lateral side, and the second lateral side. The nicking article also includes a front panel coupled to the base, the front panel having an outer perimeter. A second closure element extends along a majority of the outer perimeter of the front panel and is configured to selectively engage the first closure element to open or close access to an internal space of the nicking article. The rucking article also includes a plurality of support pads along the exterior side and adjacent to the top edge of the back panel. A lumbar support member is located along the exterior side and adjacent to the bottom edge, the first lateral edge, and the second lateral edge. The lumbar support member extends from the bottom edge of the base toward the top a distance that is between 20% and 30% of the height of the back panel. The lumbar support member projects outwardly relative to the plurality of support pads. The rucking article also includes an internal frame assembly encased within the back panel and that extends from the bottom edge of the back panel to top edge of the back panel, and between the first and second lateral edges. The nicking article also includes shoulder straps to secure the article to the wearer. The nicking article also includes a sternum strap removably coupled to the first shoulder strap and the second shoulder strap, the sternum strap having a releasable clasp to selectively open and close the sternum strap.

BRIEF DESCRIPTION OF THE DRAWINGS

The foregoing summary, as well as the following detailed description of illustrative embodiments of the present application, will be better understood when read in conjunction with the appended drawings. For the purpose of illustrating the present application, there is shown in the drawings illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Embodiments of the present disclosure includes a nicking article. A nicking article may be referred to as a nicking sack, nicker, or nick sack, and is specifically configured to hold weighted plates, e.g. nick plates. The nicking article is designed to be carried, lifted, etc., by the user, during physical activity as a training regimen. The nicking article 2 according to an embodiment of the present disclosure includes a combination of features that improves stability when worn and when the user engages in an exercise regimen that involves a wide range of upper and lower body movements. More specifically, the inclusion of lumbar support members 42 (FIG. 1), a rigid internal frame assembly 68 (FIGS. 9, 10), and a sternum strap 24 (FIG. 2) combine to establish both rucking article stability and rigid support that helps better distribute loads across the user's upper and lower back during use. Stability and rigid support are advantageous results of the construction of the nicking article described herein, especially when the user is carrying weighted plates inside the article while also engaging in strenuous exercise.

Figure 1:
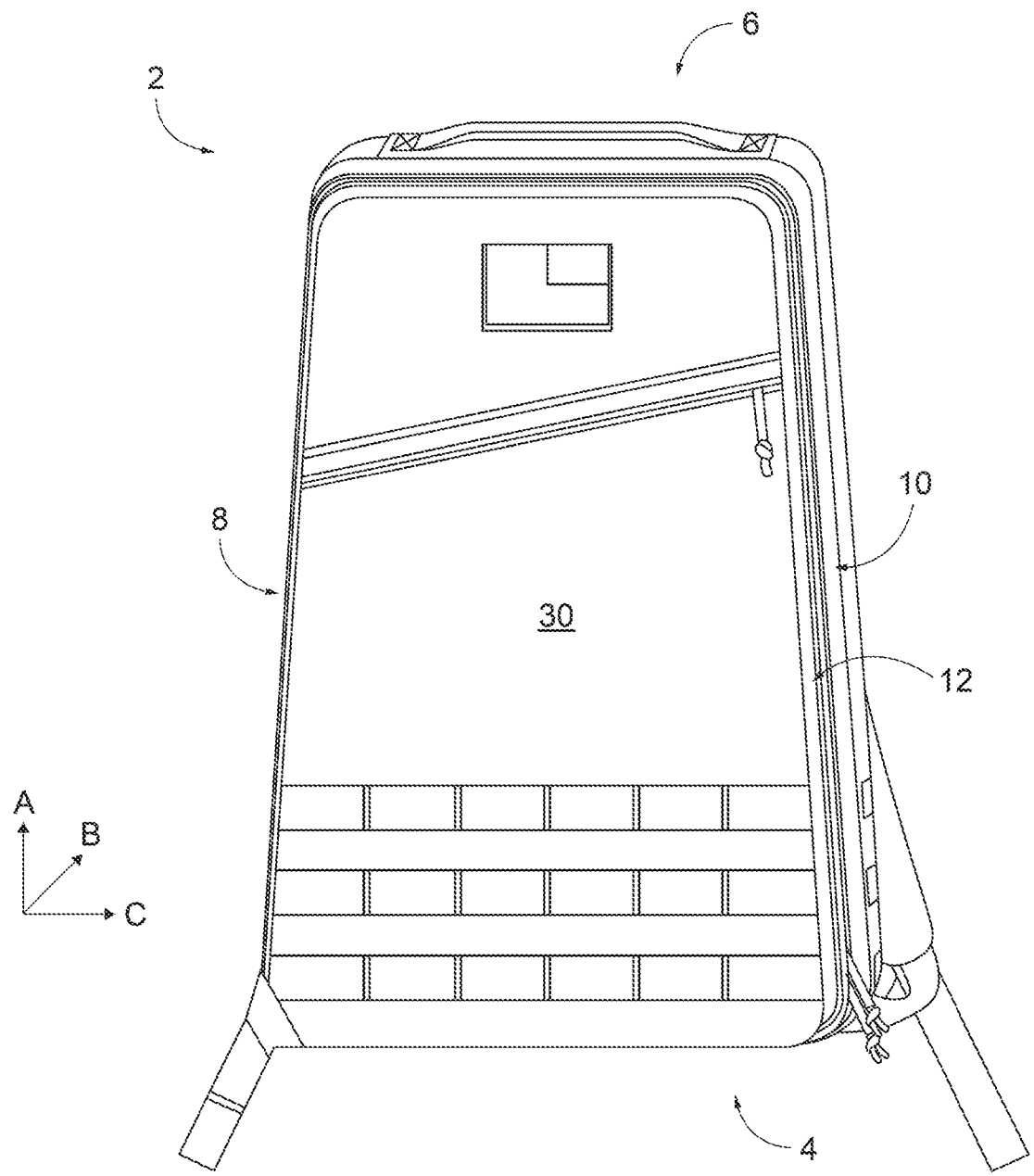
FIG. 1 is a front perspective view of a nicking article according to an embodiment of the present disclosure.
Figure 2:
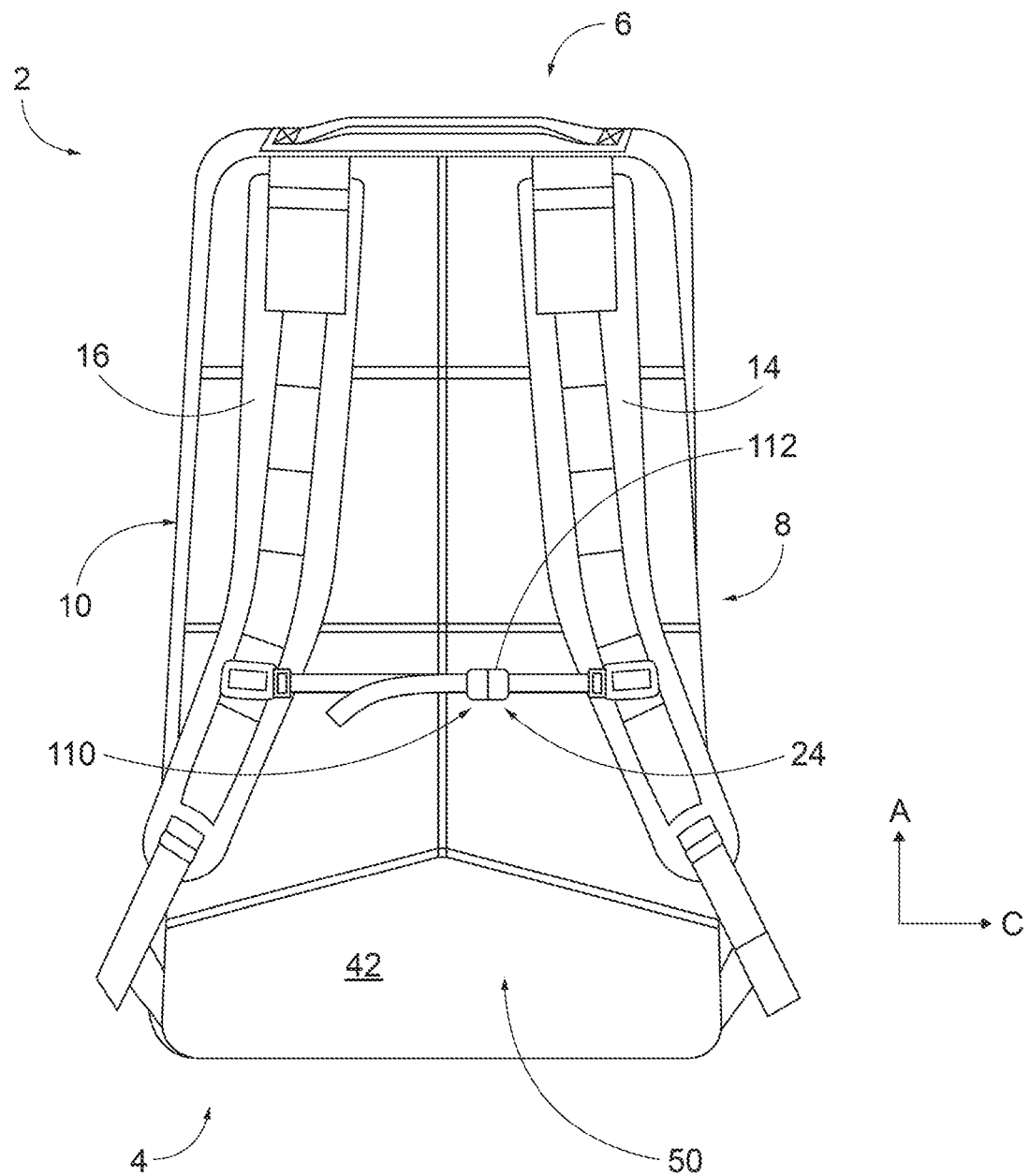
FIG. 2 is a rear view of the nicking article shown in FIG. 1.

Referring to FIGS. 1 and 2, the rucking article 2 includes a base 4, a top 6 spaced from the base 4, lateral sides 8, 10, a front panel 30 coupled to the base 4, and a back panel 50 coupled to the base 4, the top 6, and lateral sides 8, 10. A pair of shoulder straps 14, 16 are configured to secure the nicking article 2 to a user and the sternum strap 24 is removably coupled to the shoulder straps 14, 16 to contribute to article stability during use, as described above. A closure system 12 may be used to selectively open and close the nicking article 2 to permit access to an interior of the article 2, as will be further described below.

As shown in FIGS. 1 and 2, the base 4 and top 6 are spaced apart along a height direction A, the front panel and back panel are spaced part along a depth direction B, and the lateral sides 8,10 extend between the front panel 30 and the back panel 50 along a depth direction B. The lateral sides 8, 10 are spaced apart with respect to each other along a lateral (or width) direction C. Thus, the height direction A is substantially perpendicular to the depth direction B and lateral direction C. The orthogonal directions A, B, and C are used in the present disclosure only for illustrative purposes to aid in clarifying the relative positions of components of the nicking article 2.

Figure 4:
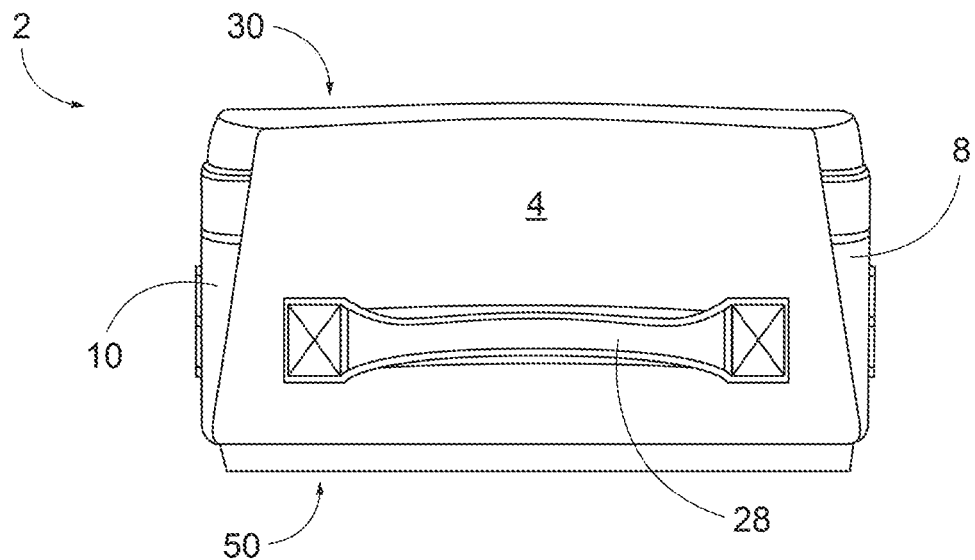
FIG. 4 is a bottom view of the nicking article shown in FIG. 1.

As shown in FIG. 4, the base 4 of the rucking article 2 includes opposed inner and outer edges and opposed sides (not numbered) that extend between the opposed inner and outer edges (not numbered). The base 4 is comprised of durable woven fabrics that may encase a cushion member, e.g. a foam, felt, batting, or other compressible material.

Figure 3:
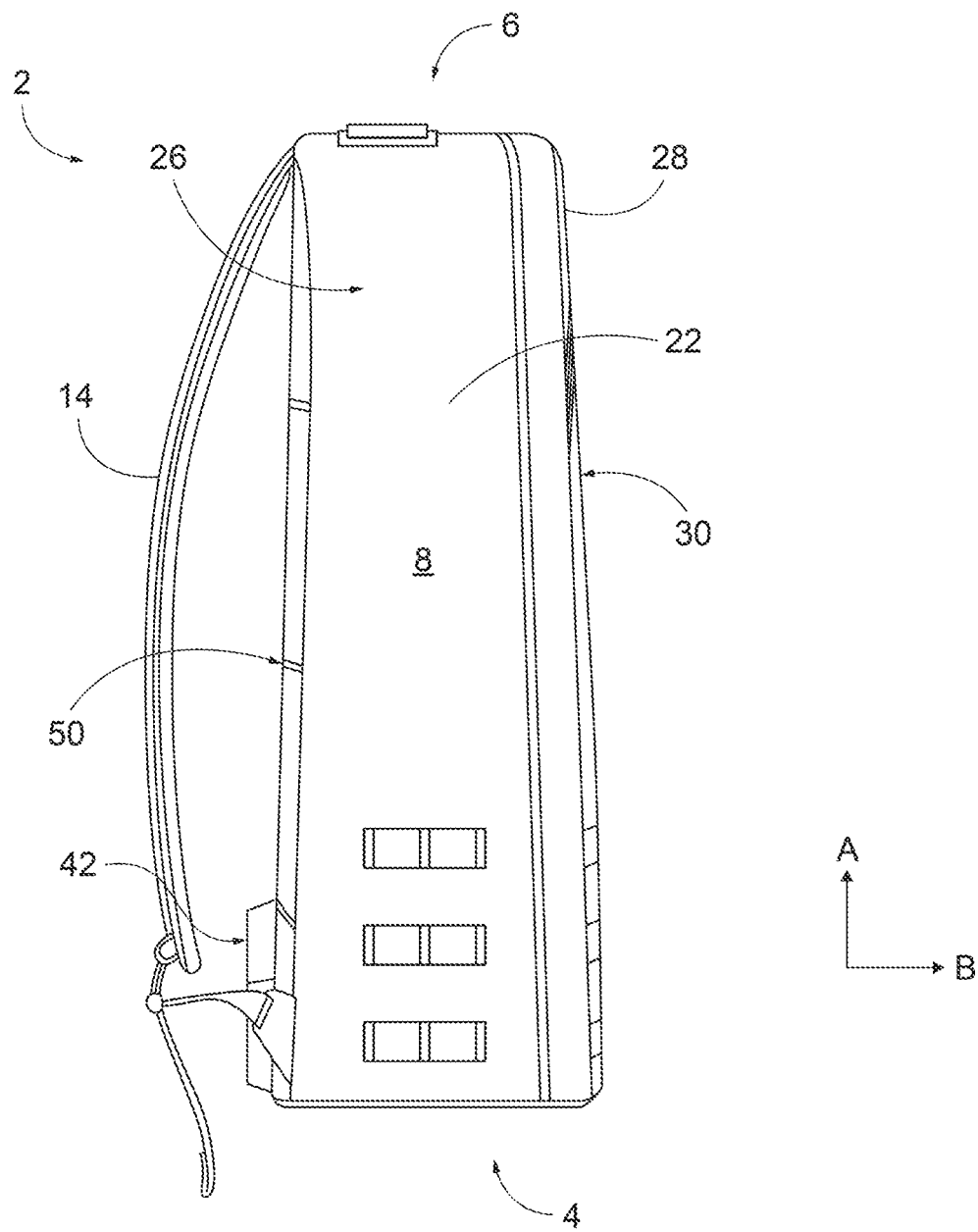
FIG. 3 is a side view of the nicking article shown in FIG. 1.

Referring to FIGS. 3 and 4, the lateral sides 8, 10 and the top 6 may be defined by a sidewall assembly 22 that is fixed to the back panel 50 and base 4. In the illustrated embodiment, the sidewall assembly 22 defines a rearward edge 26 coupled to the base 4 and the back panel 50 and an outward edge 28 that includes the first closure element 18 of the closure system 12. The closure system 12 thus removably secures a portion of the front panel 30 to the sidewall assembly 22. In alternative embodiment, however, the top 6 and lateral sides 8, 10 could also be separate components that are coupled together. The sidewall assembly 22 may be comprised of durable woven fabrics that may optionally encase a cushion member.

Figure 6:
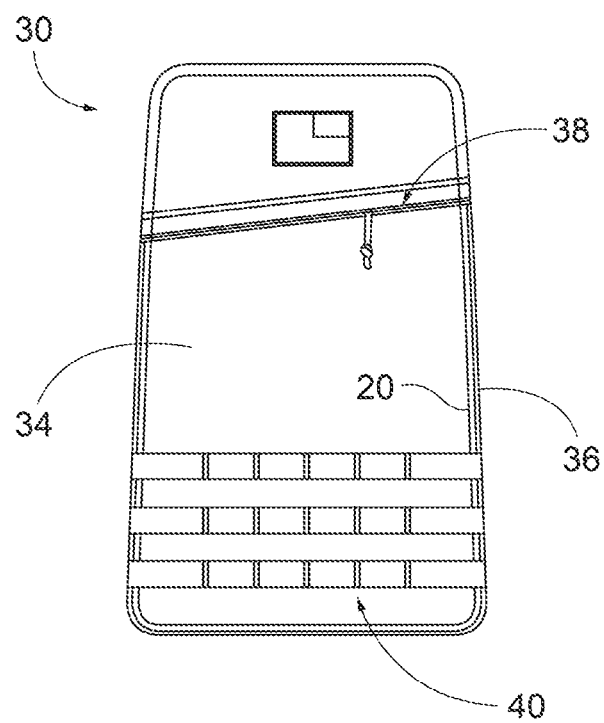
FIG. 6 is a plan view of a front panel assembly of nicking article shown in FIG. 1.
Figure 7:
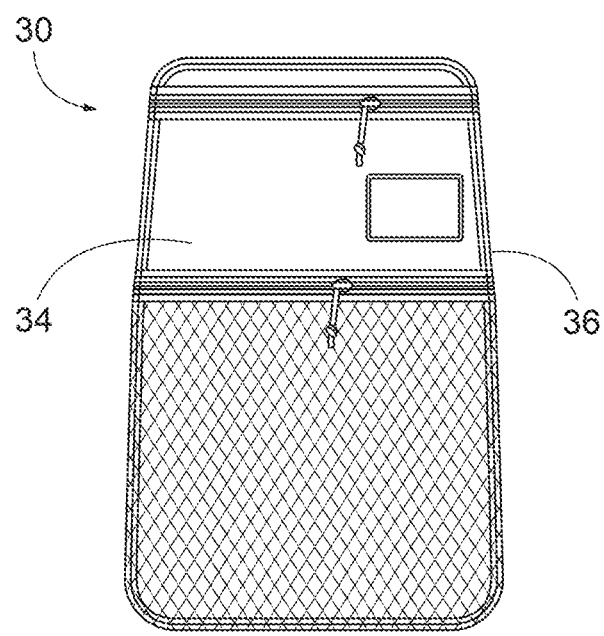
FIG. 7 is an interior view of the front panel assembly shown in FIG. 6.

Referring to FIG. 3, the front panel 30 is coupled to the base 4 and removably coupled to the top 6 and lateral sides 8, 10 via the closure system 12. Referring to FIGS. 6 and 7, the front panel 30 has an exterior side 32, shown in FIG. 6, an interior side 34, shown in FIG. 7, and an outer perimeter 36. The exterior side 32 includes an external zippered pocket 38 and webbing loops 40 located toward a bottom end (not numbered) of the front panel 30. Webbing loops 40 may be used to removably couple various items to the nicking article 2. The interior side 34 includes several pockets (not numbered) for holding items as needed, as best shown in FIG. 7. The front panel 30 includes a closure element 20 of the closure system 12. As illustrated the closure element 20 extends along a majority of the outer perimeter 36, for example, along the both lateral sides and top of the outer perimeter 36. The front panel is comprised of durable woven fabrics and may include high tenacity yarns to form the woven fabrics.

Figure 10:
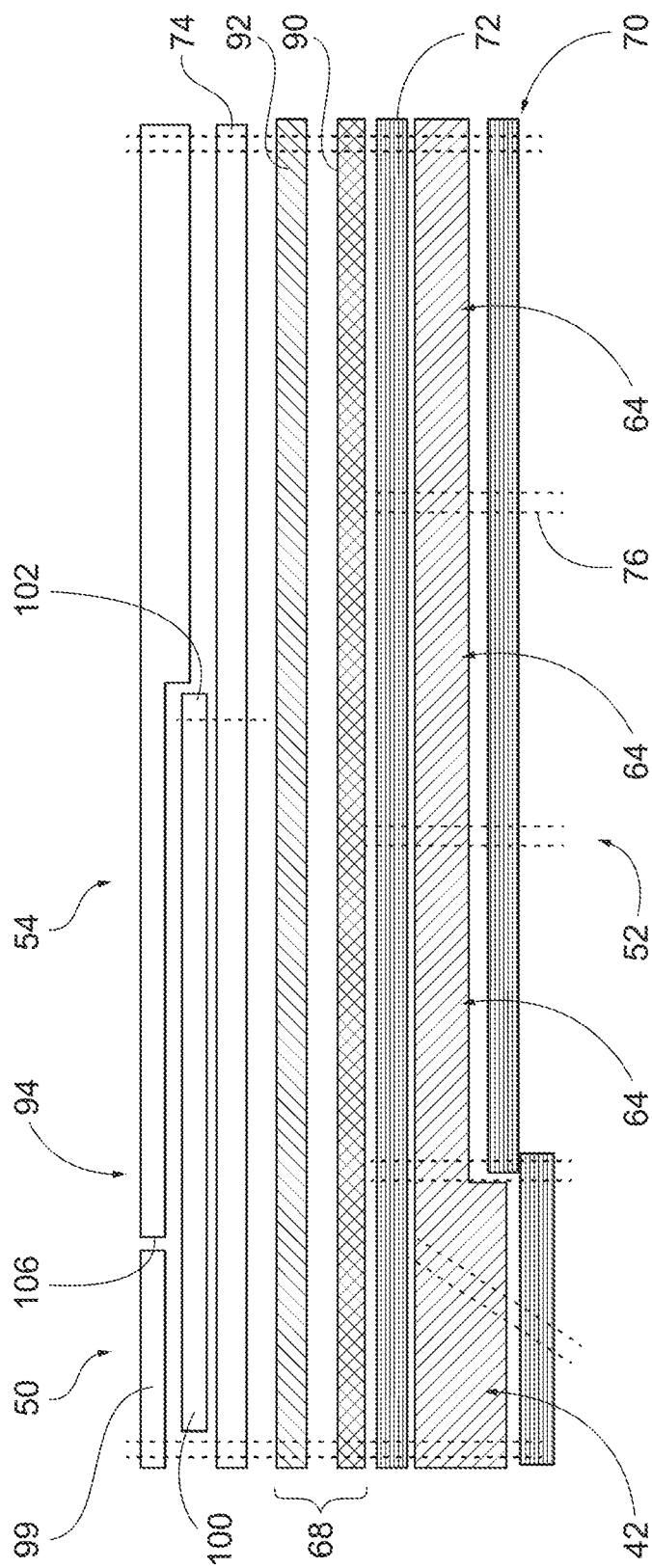
FIG. 10 is a schematic cross-sectional view of the back panel shown in FIG. 8, taken on line I-I.
Figure 11:
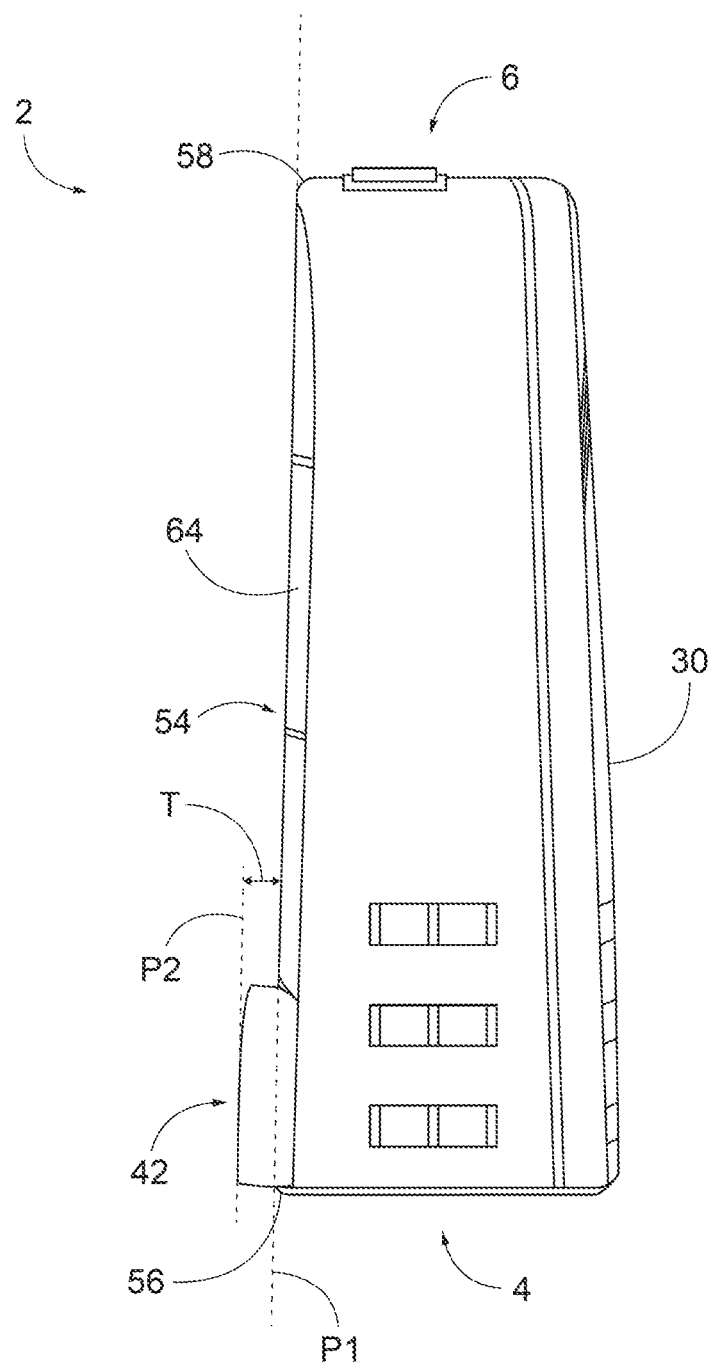
FIG. 11 is another side view of the nicking article shown in FIG. 1, with shoulder straps removed to illustrate the lumbar support members.

FIGS. 1-4 illustrate the back panel 50. The back panel 50 is shown coupled to the base 4, the top 6, and the lateral sides 8, 10 and removably coupled to front panel 30. In terms of construction, the back panel 50 has a bottom edge 56 coupled to the base 4, a top edge 58 opposite the bottom edge 56 coupled to the top 6, a first lateral edge 60, and a second lateral edge 62 opposite the first lateral edge 60. The back panel 50 has an exterior side 52 that faces a user's back when the nicking article 2 is worn by the user, and an interior side 54 opposite the exterior side 52. The back panel 50 defines a panel height H that extends from the bottom edge 56 to the top edge 58 and a width W that is perpendicular to the height H. Referring to FIG. 10, which is a schematic cross-section of the back panel 50, the back panel 50 has one or more panel layers that hold and secure various components of the back panel 50 as further explained below.

Figure 8:
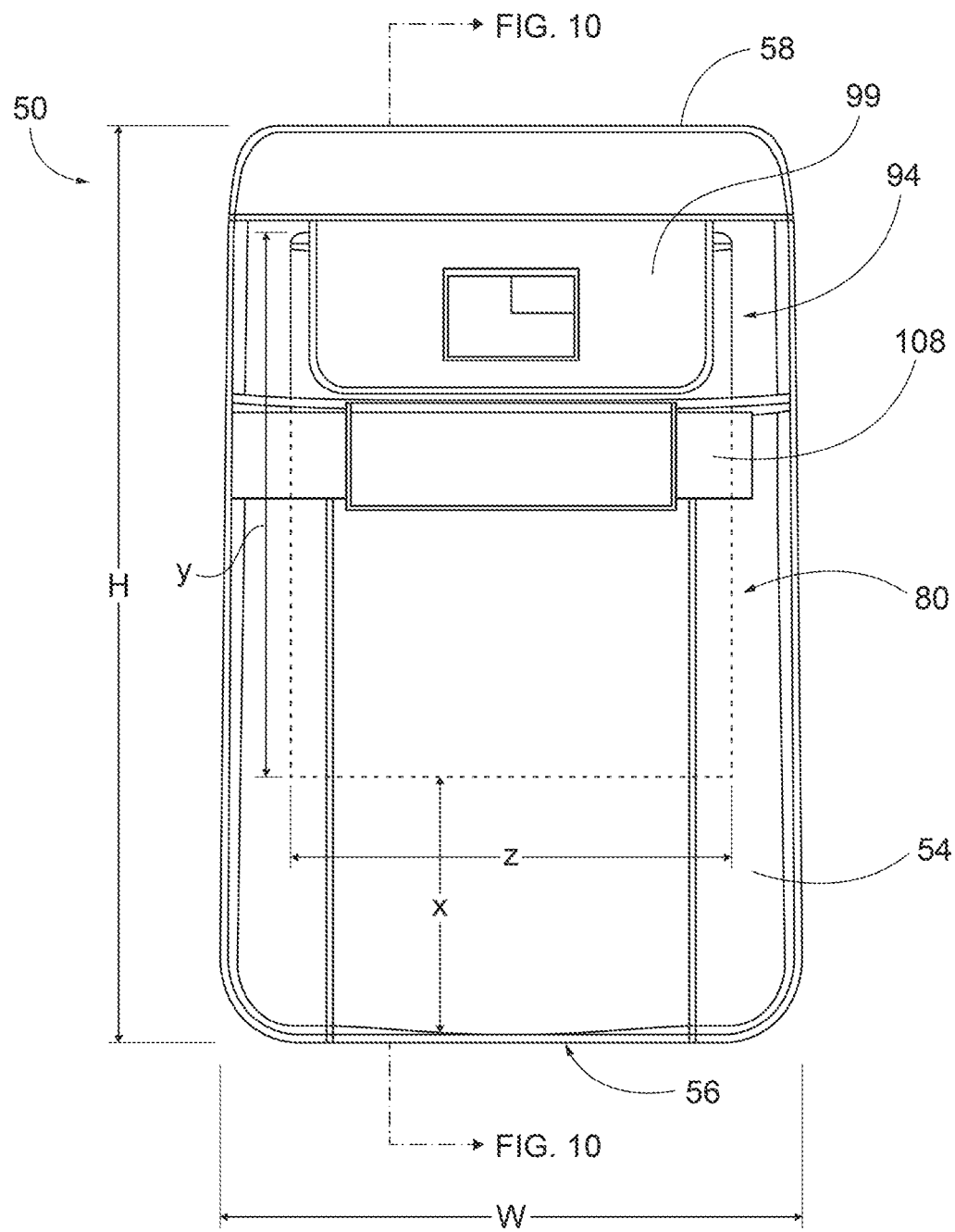
FIG. 8 is an interior view of the back panel of the nicking article shown in FIG. 1.
Figure 9:
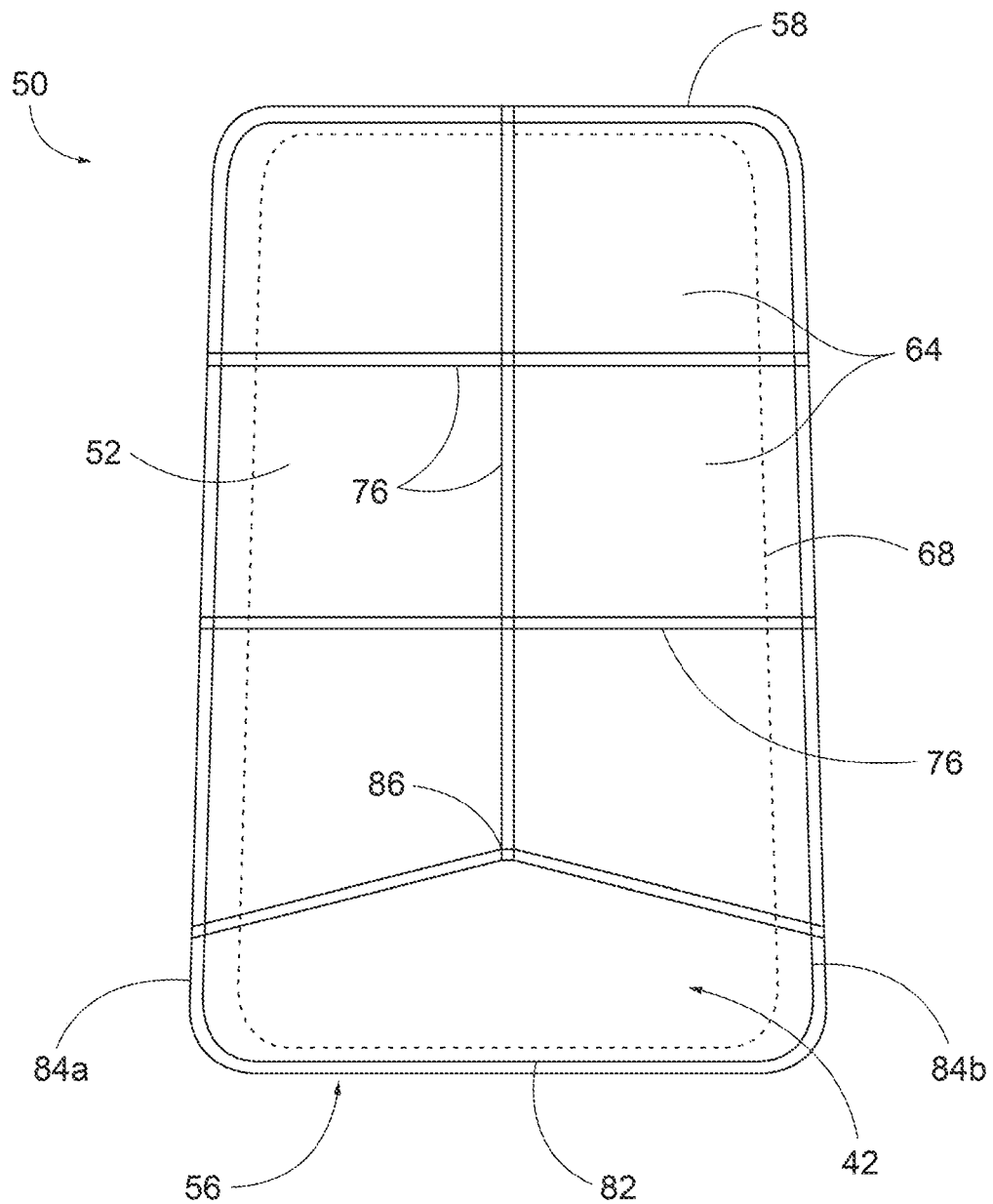
FIG. 9 is a plan view of the exterior of the back panel shown in FIG. 8.

Referring to FIGS. 8-10, the back panel 50 includes a plurality of pad members 64, a lumbar support member 42, and an internal frame assembly 68 encased within the back panel 50. An exterior panel layer 70 defines the exterior side 52 of the panel 50. The exterior panel layer 70 and interior panel layer 72 encase one or more cushion elements, which form and define the plurality of pad members 64 and lumbar support member 42. The cushion elements may comprise an open cell foam, closed cell foam or any other compressible and resilient material suitable to provide support. In one useful example, the lumbar support member 42 comprises a cross-linked polyolefin foam and the plurality of pad members comprise cross-linked polyolefin foam. Adjacent to the interior panel layer 72 is the internal frame assembly 68 and adjacent to that is another panel layer 74, to which the pocket assembly 80 is attached. Panel layer 74 may define a portion of the interior side 54 of the back panel 50. A plurality of stitch lines 76 along the exterior panel layer 70 define the size and shape of the plurality of pad members 64 and the lumbar support member 42. The plurality of pad members 64 are shown located on the exterior side 54, extend across the width with back panel 50, and biased toward the top 6 of the article 2. The lumbar support member 42 itself is located between the plurality of pad members 64 and the base 4 and is positioned to support a user's lower back when the nicking article 2 is worn.

Continuing with FIGS. 8-10, it is the size, shape, and position of the lumbar support member 42 that contributes to overall article stability and lower back support. In the illustrated embodiment, the lumbar support member 42 has a base side 82, a first lateral side 84a, a second lateral side 84b opposite the first lateral side 84a, an apex 86 spaced from base side 82, a first top edge 88a that extends from the first lateral side 84a to the apex 86, and a second top edge 88b that extends from the second lateral side 84b to the apex 86. As shown, the first top edge 88a and the second top edge 88b are angularly offset with respect to the first lateral side 84a and the second lateral side 84b, respectively. The lumber support member 42 may have other shapes and configurations as needed. For instance, the first and second top edges 88a and 88b may be substantially perpendicular to the lateral sides 84a and 84b. There may be multiple separate lumbar support members, as needed.

The lumbar support member 42, or multiple lumbar support members as the case may be, has coverage across the back panel 50 that contributes to desired article stability during use. For example, in the illustrated embodiment, the lumbar support member 42 extends across an entirety of the width W of the back panel 50. Furthermore, the lumbar support member 42 extends between 10% and 25% of the total height H of the back panel 50.

As shown in FIG. 10, the lumbar support member 42 projects outwardly relative to the pad members 64 sufficient to allow the lumber support member 42 to contact the user's lower back while allowing the pad members 64 to contact the user's upper back. More specifically, the lumbar support member 64 has an overall thickness that is greater than a thickness of any one of the plurality of pad members 64. Here, we define the thickness T as the difference between elevation of the lumber support member 42 and the pad members 64. In this regard, the plurality of pad members defines a plurality of planar contact surfaces (not numbered) that lie along a first plane P1, and the lumbar support member 42 defines a contact surface (not numbered) that lies along a second plane P2. The thickness T is the distance between planes P1 and plane P2 (along a perpendicular line that intersects both planes P1, P2. In the embodiment shown, the thickness T is between 0.25 inches to 0.5 inches. In one example, the thickness T is 0.25 inches. In another example, the thickness T is 0.3 inches. In another example, the thickness is 0.375 inches, in another example, the thickness is 0.40 inches. In another example, the thickness is 0.5 inches. The thickness T may fall outside these ranges. However, a thickness T between 0.25 and 0.50 inches is particularly useful when combined with other stability features, such as the internal frame assembly 68 and sternum strap 24.

Referring to FIGS. 9 and 10, an internal frame assembly 68 encased within the back panel 50. In the illustrated embodiment, the internal frame assembly 68 comprises a planar rigid member 90 and a foam layer 92 sitting adjacent the planar rigid member 90. The planar rigid member may be a plastic sheet or metallic sheet as needed. It may comprise a monolithic component or could be multiple components stitched together. It may include through holes or openings for weight reduction. The planar rigid member 90, however, has a size and shape that generally extends across a substantial entirety of the width of the back panel 50 and a substantial entirety of the height H of the back panel 50. The foam layer 92 sits adjacent the planar rigid member and is generally coextensive with the height and width of the planar rigid member. In other words, the foam layer 92 and planar rigid member 90 have a similar size and shape. The internal frame assembly 68 therefore supports the integrity of the article as it is weighed down, which allows a user to carry a heavier load more comfortably, and also contributes to article stability during use.

Referring to FIGS. 8 and 10, the rucking article 2 is configured to hold weighted plates with a pocket assembly 94. The pocket assembly 94 is coupled to the interior side 54 of the back panel 50 and has at least a first pocket 96 and a second pocket 98. Each of the first and second pockets 96 and 98 are sized and selected to firmly hold a rucking or weighted plate therein. The first pocket 96 has a first pocket panel 100 attached to the interior side 54 of the back panel 50, which defines a pocket length Y and the pocket width Z. A closure flap 99 is secured to the back panel 50 and is used to open or close access to the first pocket 94. As illustrated, the first pocket panel 100 is spaced apart from the base 4 and lies approximate the top 6, such that the first pocket panel 98 is biased toward the top of the back panel 50. More specifically, a bottom end 102 of the pocket panel 100 is spaced from a bottom edge of back panel a distance X that is between 20% and 30% of a total height H of the back panel 50.

The pocket assembly design works on conjunction with the other design elements of the rucking article 2. In this regard, the first pocket does not overlie any portion of the lumbar support member 42 along the exterior side of the back panel. In other words, the first pocket is positioned inside the nicking article 2 so that it does interfere with position and use of the lumbar support member 42. In use, this can be important as it the pocket position keeps the weight elevate on the user's back and permits the lumbar support member 42 to provide support where it is designed to—the lower back. This, in turns, helps create improved stability for wearer by aiding even distribution of loads by the internal frame assembly. The sternum strap 24, in turn, also aids stability by helping position the weighted plate where it is intended to be—the users upper back off of the lumbar area.

The second pocket 96 has a second pocket panel 104 that overlies the first pocket panel 100. The second pocket panel 104 defines a top edge 106 that sits below the closure flap 99 with the closure flap 99 in a closed position. The second pocket 96 may be gusseted or pleated to accommodate one or more plates. An elastic strap 108 extends across the top of the second pocket to help secure items therein.

The nicking article 2 includes shoulder straps 8, 10 that extends between the top and lateral sides proximate the top and partially overly the back panel 50. The shoulder straps configured to secure the nicking article 2 to a wearer. In certain embodiments, the shoulder straps 8, 10 are extra padded to carry heavier loads more comfortably.

The sternum strap 24 is removably coupled to the shoulder straps and configured to be selectively clasped as needed to facilitate improved stability. The sternum strap includes a first strap portion (not shown) removeable coupled to shoulder strap 8, a first clasp member 110 slidably positioned along the first strap portion and second strap portion, and a second clasp member slidably positioned along the second strap portion. The first and second clasp members can be connected together as needed. The sternum strap can be repositioned along different loops coupled to the shoulder strap to adjust the positioning of the strap 24 relative to the user. The combination of the lumbar support members 42 (FIG. 1), a rigid internal frame assembly 68 (FIGS. 9, 10), and a sternum strap 24 (FIG. 2) are configured to maintain stability of the nicking article 2 during active movement by the wearer when the nicking article is worn and the sternum strap is clasped.

Figure 12A:
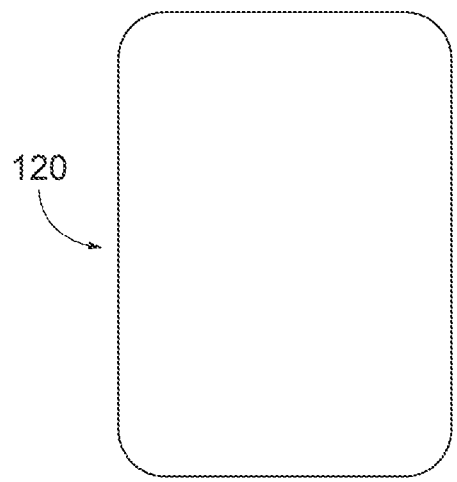
FIG. 12A is a plan view of a nicking plate according to an embodiment of the present disclosure.
Figure 12B:
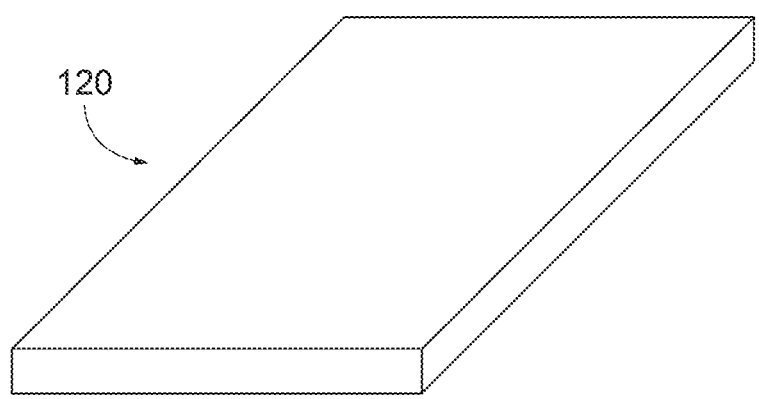
FIG. 12B is a perspective view of a nicking plate according to an embodiment of the present disclosure.

FIGS. 12A and 12B illustrate an exemplary weighted plate 120 for insertion in the first and second pockets 94 and 96. Each weighted plate 120 has a length, width, and thickness (not numbered) that are selected so that the weighted plates slidingly fit within the pocket 94 or pocket 96 without substantially movement therein. In other words, the pockets 94, 96 and plates 120 have similar dimensions. The weighted plates have a variety of weights. For example, the weighted plate may be 10 lbs., 15 lbs., 20 lbs., 25 lbs., 30 lbs., 35 lbs., 40 lbs. 45 lbs. or 50 lbs.

Referring now to FIGS. 1 and 3, the closure system 12 may be used to selectively open and close the nicking article 2 to permit access to an interior of the article 2. The closure system 12 includes a first closure element 18 fixed to an entirety of the outward edge 28 of the sidewall assembly 22. A second closure element 20 is fixed to the top and side edges of the front panel assembly 22. The front panel 30 is coupled, or fixed, to the base 4. The first and second closure elements 18 and 20 are thus configured to selectively engage with each other so that a portion of the front panel 20 is removably coupled to the top 6 and at least a portion of each of the lateral sides 8, 10 of the nicking article 2. In this configuration, the nicking article 2 can open flat so that it is easier to access the internal pockets and otherwise organize its contents. In alternative embodiments, the closure system 12, e.g. the first and second closure elements 18, 20, may extend along only a portion of the lateral sides and/or top of the nicking article 2. For example, the closure system 12 may extend along only the top of the nicking article 2. In various embodiments of the nicking article 2, the closure system 12, e.g. a zipper, can be made with silent, glove friendly zipper pulls constructed from parachute cord, which, in one example is a 550 denier cord. Other types of closures, pulls, and cord sizes may be used.

Figure 5:
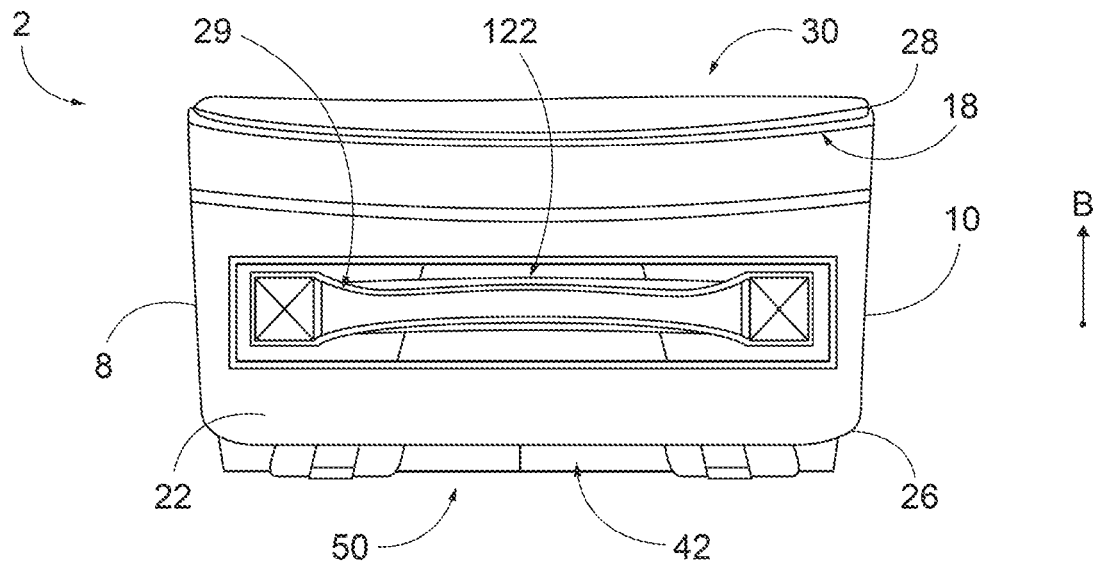
FIG. 5 is a top view of the nicking article shown in FIG. 1.

Referring to FIGS. 4 and 5, the base 4 also includes a durable handle 28 that can be used to grab the article as described further below and the top 6 include a durable handle 29. Though not shown, the lateral sides can further comprise side durable handles. The base 4 may include various reinforced drainage ports allowing fluid to pass through as needed. The nicking article 2 may also include a hip belt assembly coupled thereto proximate the base 4. The top 6 also includes a port 122 (FIG. 5) with a hook and loop closure overlying the port. The port is sized for a tube of a hydration bladder positionable inside the rucking article 2. Hi visibility straps may be used as a reflective member and are paced along straps and on front panel for safety.

Each of the various components, such as the back panel, front panel, top, base, and sides are comprised of durable woven fabrics. The article is comprised of tear and wear resistant fabrics comprised of 1000 denier CORDURA® yarns. Any number of weave constructions and deniers may be used, however. However, a less abrasive fabric may be used on the back panel and underside of the shoulder straps to reduce friction and the like. The back panel and shoulder straps, for example, may be comprised of woven fabrics comprising 210 denier, High Tenacity CORDURA® yarns.

The nicking article 2, in general, has a size and shape to fit comfortably on the user's upper torso. More specifically, the nicking article 2 has overall width W that extends from one side to other side, an overall height H that extends from the base 4 to the top 6 and that is perpendicular to the overall width W, and an overall depth D that extends from an exterior side 54 of the back panel 50 to the an exterior side 32 of the front panel 30. The overall depth D is substantially perpendicular to the overall height H and the overall width W. In one exemplary embodiment, the rucking article 2 has an overall width W between 10.0 inches and 13.0 inches, an overall height H between 15.0 inches and 22.0 inches, and an overall depth D is between 4.0 inches and 7.25 inches. Furthermore, the nicking article 2 is designed to have an overall weight that can vary between about 2.30 lbs. and about 3.30 lbs. In some cases, the overall article weight may vary outside of these specific ranges.

While the disclosure is described herein, using a limited number of embodiments, these specific embodiments are not intended to limit the scope of the disclosure as otherwise described and claimed herein. The precise arrangement of various elements and order of the steps of articles and methods described herein are not to be considered limiting. For instance, although the steps of the methods are described with reference to sequential series of reference signs and progression of the blocks in the figures, the method can be implemented in an order as desired.

The invention claimed is:

1. A rucking article, comprising:
    a base;
    a top spaced from the base;
    lateral sides that extend from the base toward the top;
    a front panel coupled to the base;
    a back panel coupled to the base, the top, and the lateral sides, the back panel having an exterior side, an interior side opposite the exterior side, a height that extends from the base to the top, and a width that is perpendicular to the height;
    a plurality of pad members on the exterior side that extend across the width, the plurality of pad members each defining a planar contact surface that lies along a first common plane, each of the plurality of pad members formed by a cushion element made of compressible and resilient material;
    a lumbar support member located between the plurality of pad members and the base, the lumbar support member defining a second planar contact surface that lies along a second plane spaced from the first common plane, wherein the lumbar support member has a thickness that is greater than a thickness of any one of the plurality of pad members;
    a closure that removable couples the front panel to the top and at least a portion of each of the lateral sides, such that the closure is configured to permit access to an interior of the rucking article;
    a pocket assembly coupled to the interior side of the back panel, the pocket assembly having at least a first pocket with a pocket width and a pocket length that is perpendicular to the pocket width, and a closure flap, wherein the pocket width and the pocket length is sized and selected to firmly hold an object inside the first pocket;
    an internal frame assembly inside a compartment defined between the interior side and exterior side of the back panel, the internal frame assembly extending from the base to the top within the compartment, such that, the internal frame assembly provides rigid support to the back panel along an entirety of the height of the back panel and the width, the internal frame assembly comprising a planar rigid member and foam layer, the planar rigid member extending across the entire width of the back panel and the entire height of back panel, wherein the foam layer is substantially adjacent to and coextensive with the planar rigid member;

shoulder straps configured to secure the rucking article to a wearer; and a sternum strap removably coupled to the shoulder straps and configured to be selectively clasped, wherein the combination of the lumbar support member, the internal frame assembly, and the sternum strap are configured to maintain stability of the rucking article during active movement by the wearer when the rucking article is worn, and the sternum strap is clasped.

2. The rucking article of claim 1, wherein the lumbar support member extends across an entirety of the width of the back panel, and between 10% and 25% of the height of the back panel.

3. The rucking article of claim 1, wherein the lumbar support member has a base side, a first lateral side, a second lateral side opposite the first lateral side, an apex spaced from base side, a first top edge that extends from the first lateral side to the apex, and a second top edge that extends from the second lateral side to the apex, wherein the first top edge and the second top edge are angularly offset with respect to the first lateral side and the second lateral side, respectively.

4. The rucking article of claim 1, wherein the exterior side of the back panel has a plurality of stitch lines that define a size and shape of the plurality of pad members and the lumbar support member.

5. The rucking article of claim 1, wherein the thickness extends perpendicularly from the first common plane to the second plane and is between 0.25 inches to 0.5 inches.

6. The rucking article according to claim 1, wherein the pocket assembly has a first pocket comprising a first pocket panel attached to the interior side of the back panel, wherein the first pocket panel defines the pocket length and the pocket width, wherein the first pocket panel is spaced apart from the base and lies proximate the top, such that the first pocket panel is biased toward the top of the back panel.

7. The rucking article according to claim 6, wherein first pocket does not overlie any portion of the lumbar support member.

8. The rucking article according to claim 6, wherein a bottom end of the pocket panel is spaced from a bottom edge of back panel a distance that is between 20% and 30% of a total height of the back panel.

9. The rucking article according to claim 6, wherein the pocket assembly includes a second pocket comprising a second pocket panel that overlies the first pocket panel, wherein the second pocket panel defines a top edge that sits below the closure flap with the closure flap is in a closed position.

10. The rucking article according to claim 1, wherein the internal frame assembly is adjacent to an interior panel layer and a panel layer to which a pocket assembly is attached, wherein the foam layer of the internal frame assembly is adjacent to the panel layer to which the pocket assembly is attached and the planar rigid member is adjacent to the interior panel layer.

11. The rucking article according to claim 1, wherein the object is a rucking plate having a length and width selected to slidingly fit within a pocket of the pocket assembly.

12. The rucking article according to claim 1, wherein the object is between 15 lbs. and 45 lbs.

13. A rucking article, comprising:

a base;

a top opposite the base;

a back panel having a bottom edge coupled to the base, a top edge opposite the bottom edge a coupled to the top, a first lateral edge, a second lateral edge opposite the first lateral edge, a height that extends from the bottom edge to the top edge, a width perpendicular to the height, an exterior side that faces a user's back when the rucking article is worn by the user, and an interior side opposite the exterior side;

a first lateral side and a second lateral side opposite the first lateral side, the first and second lateral sides defining a depth of the rucking article that is perpendicular to the height and the width;

a first closure element that extends along at least a portion of the top edge, the first lateral side, and the second lateral side;

a front panel coupled to the base, the front panel having an outer perimeter;

a second closure element that extends along a majority of the outer perimeter of the front panel, the second closure element configured to selectively engage the first closure element to open or close access to an internal space of the rucking article;

a plurality of support pads along the exterior side and adjacent to the top edge of the back panel, the plurality of support pads each defining a planar contact surface that lies along a first common plane, each of the plurality of pad members formed by a cushion element made of compressible and resilient material;

a lumbar support member along the exterior side and adjacent to the bottom edge, the first lateral edge, and the second lateral edge, the lumbar support member extending from the bottom edge of the base toward the top a distance that is between 20% and 30% of the height of the back panel, the lumbar support member defining a second planar contact surface that lies along a second plane spaced from the first common plane, wherein the lumbar support member projects outwardly relative to the plurality of support pads;

an internal frame assembly encased within the back panel and that extends from the bottom edge of the back panel to top edge of the back panel, and between the first and second lateral edges, the internal frame assembly comprising a planar rigid member and foam layer, the planar rigid member extending across the entire width of the back panel and the entire height of back panel, wherein the foam layer is substantially adjacent to and coextensive with the planar rigid member;

shoulder straps that extend from a top edge of the back panel toward the lateral sides edges or bottom edge of the back panel; and a sternum strap removably coupled to the shoulder straps, the sternum strap having a releasable clasp to selectively open and close the sternum strap.

14. The rucking article of claim 13, wherein the combination of the lumbar support member, the internal frame assembly, and the sternum strap are configured to maintain stability of the rucking article during active movement by the wearer when the rucking article is worn, and the sternum strap is clasped.

15. The rucking article of claim 13, wherein the lumbar support member has a base side, a first lateral side, a second lateral side opposite the first lateral side, an apex spaced from base side, a first top edge that extends from the first lateral side to the apex, and a second top edge that extends from the second lateral side to the apex, wherein the first top edge and the second top edge are angularly offset with respect to the first lateral side and the second lateral side, respectively.

16. The rucking article of claim 13, wherein the lumbar support member has a thickness that is greater than a thickness of any one of the plurality of support pads.

17. The rucking article of claim 13, wherein the exterior side of the back panel has a plurality of stitch lines that define a size and shape of the plurality of support pads and the lumbar support member.

18. The rucking article according to claim 13, wherein the thickness extends perpendicularly from the first common plane to the second plane and is between 0.25 inches to 0.5 inches.

19. The rucking article according to claim 13, further comprising a pocket assembly having a first pocket comprising a first pocket panel attached to the interior side of the back panel, and a closure flap, wherein the first pocket panel defines the pocket length and the pocket width, wherein the first pocket panel is spaced apart from the base and lies proximate the top, such that the first pocket panel is biased toward the top of the back panel.

20. The rucking article according to claim 19, wherein first pocket does not overlie any portion of the lumbar support member.

21. The rucking article according to claim 19, wherein a bottom end of the pocket panel is spaced from a bottom edge of back panel a distance that is between 20% and 30% of a total height of the back panel.

22. The rucking article according to claim 19, wherein the pocket assembly includes a second pocket comprising a second pocket panel that overlies the first pocket panel, wherein the second pocket panel defines a top edge that sits below the closure flap with the closure flap is in a closed position.

23. The rucking article according to claim 13, wherein the internal frame assembly is adjacent to an interior panel layer and a panel layer to which a pocket assembly is attached, wherein the foam layer of the internal frame assembly is adjacent to the panel layer to which the pocket assembly is attached and the planar rigid member is adjacent to the interior panel layer.

24. The rucking article according to claim 19, further comprising a rucking plate having a length and width selected to slidingly fit within a pocket of the pocket assembly.

25. The rucking article according to claim 24, wherein the rucking plate is between 15 lbs. and 45 lbs.

26. The rucking article according to claim 1, wherein the top includes a port sized to receive a tube therethrough.

27. The rucking article according to claim 13, wherein the top includes a port sized to receive a tube therethrough.

* * * * *